United States Patent [19]

Ichikawa et al.

[11] Patent Number: 4,994,130
[45] Date of Patent: Feb. 19, 1991

[54] METHOD FOR PRODUCING A COMPOSITE LAMINATE

[75] Inventors: Kunihiko Ichikawa, Machida; Kiyoshi Mishima, Ageo; Kunio Tsukagoshi, Hamura; Isao Hayatsu, Mizuho; Toshiharu Yamazaki, Ome, all of Japan

[73] Assignee: Mitsubishi Kasei Corporation, Tokyo, Japan

[21] Appl. No.: 394,814

[22] Filed: Aug. 17, 1989

[30] Foreign Application Priority Data

Aug. 30, 1988 [JP] Japan .................. 63-215953
Aug. 30, 1988 [JP] Japan .................. 63-215954

[51] Int. Cl.⁵ .............................. B65D 37/00
[52] U.S. Cl. .................. 156/164; 156/244.27; 156/306.6; 156/322; 156/324
[58] Field of Search ........ 156/320, 322, 306.6, 156/324, 314, 315, 244.27, 163, 164, 494–495

[56] References Cited

U.S. PATENT DOCUMENTS 2,877,151 3/1959 Doherty et al. ............ 156/322 X
3,725,169 4/1973 Allen ...................... 156/164 X
4,389,438 6/1983 Ohtsuki et al. ........... 156/306.6 X

*Primary Examiner*—David A. Simmons
*Attorney, Agent, or Firm*—Oblon, Spivak, McClelland, Maier & Neustadt

[57] ABSTRACT

A method for continuously producing a composite laminate comprising a thermoplastic synthetic resin sheet and an aluminum sheet laminated on each side of the resin sheet, wherein (1) as the thermoplastic resin sheet, a solid sheet is used,
(2) as the aluminum sheet, an aluminum sheet having a thermoplastic adhesive layer provided on its surface is used,
(3) two such aluminum sheets with the respective adhesive layers facing to each other, with the thermoplastic synthetic resin sheet interposed therebetween, are fed to hot press bonding rollers, and
(4) when they are fed to the hot press bonding rollers, (a) a tension of at least 2 kg/mm² is exerted to each aluminum sheet, and (b) the thermoplastic adhesive layer provided on the surface of each aluminum sheet is maintained to be in a molten state.

6 Claims, 3 Drawing Sheets

METHOD FOR PRODUCING A COMPOSITE LAMINATE

The present invention relates to a method for producing a composite laminate having excellent surface smoothness. More particularly, the present invention relates to a process for producing a composite laminate comprising a thermoplastic synthetic resin sheet and an aluminum or iron sheet laminated on each side of the resin sheet.

Various composite laminates are known wherein a metal sheet is laminated on a thermoplastic synthetic resin sheet. The following methods are known to make the surface of such composite laminates smooth: a method wherein the laminate materials are fed to first rollers having a clearance equal or larger than the thickness of the laminate (the total thickness of the metal layer, the adhesive layer and the core material layer), the laminate discharged from the first rollers are passed through a number of zigzag rollers to complete the bonding and to smooth the laminate (U.S. Pat. No. 3,660,207); a method wherein a melt polyolefin sheet and a pair of metal sheets each having a adhesive film having a specific composition attached thereto, are fed to press rollers and bonded to one another under a pressed condition, and then passed through a number of cooling rolls disposed in parallel to one another to obtain a laminate (Japanese Unexamined Patent Publication No. 88884/1978); and a method wherein a pair of metal sheets stretched under a prescribed tension are preheated, and the preheated metal sheets and a synthetic resin sheet in a molten state are fed between hot press rollers for bonding, the resulting laminate is passed through a plurality of rollers disposed in a zigzag fashion, under cooling, to impart a prescribed bending to the laminate, so as to obtain a laminate having excellent surface smoothness (U.S. Pat. No. 4,521,265). Here, during the passage of the laminate through a plurality of rollers disposed in a zigzag fashion, the synthetic resin changes from a molten state to a solidified state. At that time, a forcible bending is exerted to the laminate, whereby the tension is relaxed, and as a result, wrinkles or waves formed on the metal sheet surface will disappear. The tension for stretching the metal sheets is usually controlled at a level of from 0.2 to 1.5 kg/mm$^2$.

When the resin sheet is supplied in a solid state, so-called transverse waves were problematic which form at the end portions of the composite laminate in a direction perpendicular to the stretching direction, although so-called longitudinal waves are little which form in the stretching direction of the laminate.

As a method for bonding a metal sheet and a resin sheet, if a metal sheet having an adhesive layer preliminarily formed, is stored in a rolled state, the bonding of the rolled metal sheet is likely to take place depending upon the nature of the adhesive layer or the temperature during the storage. Therefore, a complicated method has been adopted in which the adhesive layer is preliminarily separately prepared as a thin film, such an adhesive layer is laminated on the metal sheet immediately prior to bonding the metal sheet and the resin layer as the core material.

It is an object of the present invention to provide an industrially advantageous method whereby a laminate having excellent surface smoothness can be prepared only by the bonding operation by means of a pair of hot press rollers by bonding aluminum sheets or iron sheets to a solid thermoplastic synthetic resin sheet while imparting a high tension.

Another object of the present invention is to provide a method wherein as the adhesive layer between a metal sheet and a synthetic resin sheet, a modified polyolefin layer and a layer of the same resin as the core material are sequentially formed on the surface of the metal sheet, whereby even when the metal sheet is stored in a rolled state, there will be no adhesion in the rolled sheet.

The present invention provides a method for continuously producing a composite laminate comprising a thermoplastic synthetic resin sheet and an aluminum or iron sheet laminated on each side of the resin sheet, wherein (1) as the thermoplastic resin sheet, a solid sheet is used,
(2) as the aluminum or iron sheet, an aluminum or iron sheet having a thermoplastic adhesive layer provided on its surface is used,
(3) two such aluminum or iron sheets with the respective adhesive layers facing to each other, with the thermoplastic synthetic resin sheet interposed therebetween, are fed to hot press bonding rollers, and
(4) when they are fed to the hot press bonding rollers, (a) a tension of at least 2 kg/mm$^2$ is exerted to each aluminum sheet or a tension of at least 6 kg/mm$^2$ is exerted to each iron sheet, and (b) the thermoplastic adhesive layer provided on the surface of each aluminum or iron sheet is maintained to be in a molten state.

The feature of the present invention resides in that the thermoplastic synthetic resin sheet sandwiched between aluminum or iron sheets each provided with a thermoplastic adhesive layer, is fed to hot press bonding rollers while exerting a high tension of at least 2 kg/mm$^2$ in the case of the aluminum sheets or at least 6 kg/mm$^2$ in the case of the iron sheets, so that the metal sheets can instantaneously be bonded to the solid thermoplastic synthetic resin sheet without forming wrinkles or waves.

Now, the present invention will be described in detail with reference to the accompanying drawings:

FIG. 1 is a diagrammatic side view illustrating an embodiment of the apparatus used for the method of the present invention.

FIG. 2 is similar to FIG. 1 except that adhesive layers 14 and 14' to be applied to metal sheets 12 and 12' are prepared separately in the apparatus of FIG. 1.

Figure 5:
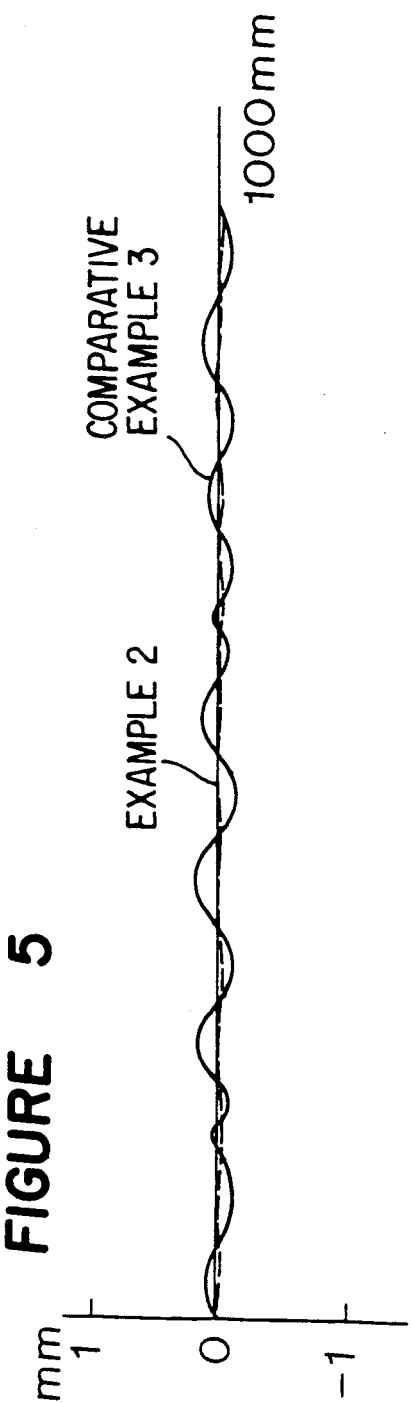

FIG. 5 likewise shows transverse waves at the end portions in the stretching direction of the composite laminates obtained in Example 2 (broken line) and Comparative Example 3 (solid line).

Figure 1:
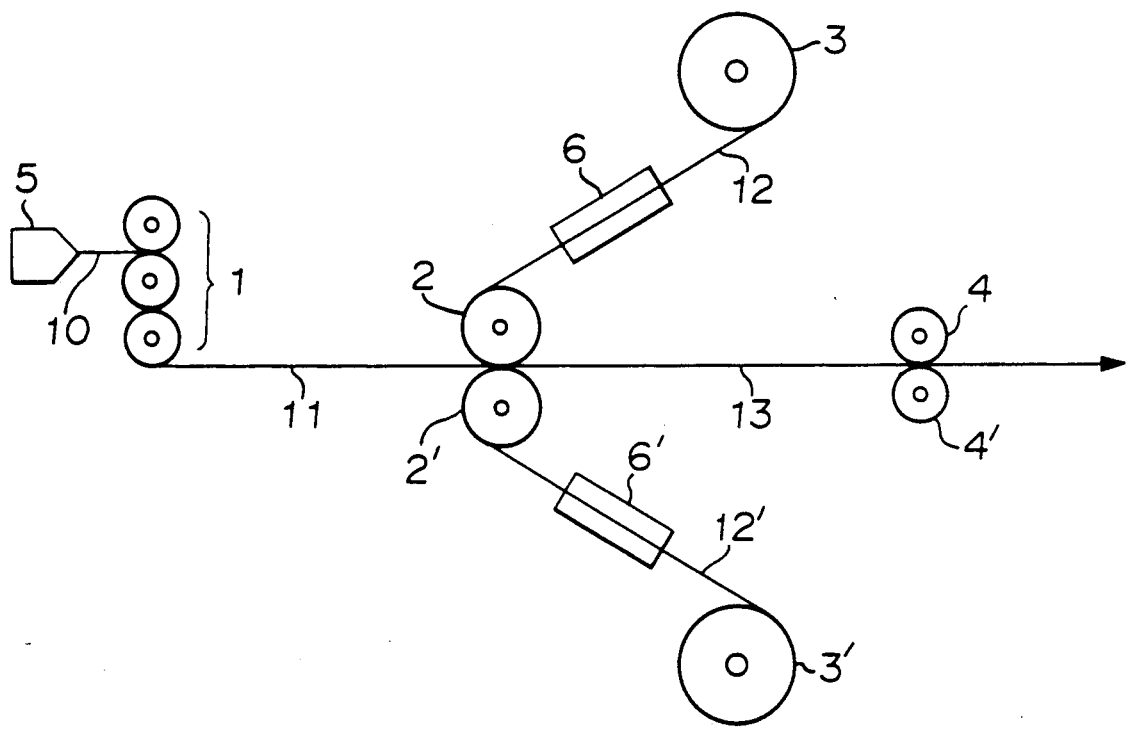

FIG. 1 illustrates an embodiment of the entire process for continuously producing the composite laminate according to the present invention. The reference numerals in the Figure represent as follows:

1: a three-roll
2,2': hot press bonding rollers
3,3': pay off reels
4,4': haul off rolls
5: extruder
6,6': preheaters 10: molten thermoplastic synthetic resin sheet
11: solid thermoplastic synthetic resin sheet
12,12': aluminum or iron sheets
13: composite laminate As the thermoplastic synthetic resin sheet, any thermoplastic synthetic resin may be used without any particular restriction so long as it is useful for usually extrusion molding. It includes, for example, polyethylene, polypropylene, polybutene, polyvinyl chloride, polystyrene, polyamide, polyethylene terephthalate, polybutylene terephthalate and polycarbonate. From the viewpoint of the extrusion molding properties, it is preferred to employ a polyolefin synthetic resin such as polyethylene, polypropylene or polybutene. As such a thermoplastic resin, not only a virgin material, but also a recovered material or reproduced material may be used in the form of a sheet. To such a thermoplastic resin, a foaming agent, a flame retardant, a filler, a coloring agent, etc. may be incorporated as the case requires.

The thermoplastic synthetic resin sheet 10 extruded in a molten state from the extruder 5 is formed into a sheet having a predetermined thickness by polishing unit for example a three-roll 1 provided with a cooling means. The thickness of the sheet may suitably be selected depending upon the desired thickness of the composite laminate without any particular restriction. However, the thickness is usually from 1 to 10 mm. In order to obtain a composite laminate having excellent surface smoothness, it is important that the surface smoothness and the thickness precision of the solid thermoplastic synthetic resin sheet 11 itself should be excellent. For this purpose, it is desired to precisely control the extrusion rate, the resin temperature and the wind-up speed and to correct them by the a three-roll or a steel belt.

In the present invention, for bonding the thermoplastic synthetic resin sheet to aluminum or iron sheets, the synthetic resin sheet is required to be supplied in a solid state i.e. not in a molten state, to the hot press bonding rollers. When it is fed in a molten state, the control of the thickness by the hot press bonding rollers tends to be difficult, and the composite laminate thereby obtained will be inferior in the surface smoothness. The thermoplastic synthetic resin sheet 11 withdrawn from the a three-roll 1 is cooled to a temperature of from room temperature to 100° C., preferably from 40 to 80° C., and then fed to the hot pres bonding rollers in the form of a solid sheet. In FIG. 1, the operation of the extruding machine 5 and the hot press bonding step are shown as a continuous process. However, in some cases, the solid sheet 11 withdrawn from the a three-roll may once be wound up on a haul off roll, so that the extrusion step and the hot press bonding step are separated, whereby the process control (including the start up and trouble shooting) of these steps can be simplified. The solid sheet wound up on a roll is usually stored at room temperature. However, by heating the solid sheet to a temperature of from 40 to 80° C. immediately prior to feeding it to the hot press bonding rollers, it is possible to impart a contraction strain to the solid resin sheet, whereby it is possible to obtain a composite laminate having excellent heat resistance and surface smoothness. The heat resistance of the composite laminate is meant for resistance against warpage or against deterioration in the adhesiveness when the composite laminate was heated at a high temperature of from 80 to 100° C. It is of course true that the surface smoothness of the composite laminate will be excellent when the surface smoothness of the resin sheet itself is excellent. The metal sheets 12 and 12' made of aluminum or iron are withdrawn from the pay off reels 3 and 3', preheated to a predetermined temperature by preheaters 6 and 6' and then fed to hot press bonding rollers 2 and 2'. The preheating temperature is at a level sufficiently high to melt the thermoplastic adhesive layer applied to each metal sheet. For example, when the adhesive layer is made of a polyolefin resin, the preheating is conducted at a temperature of from 120 to 150° C.

Figure 2:
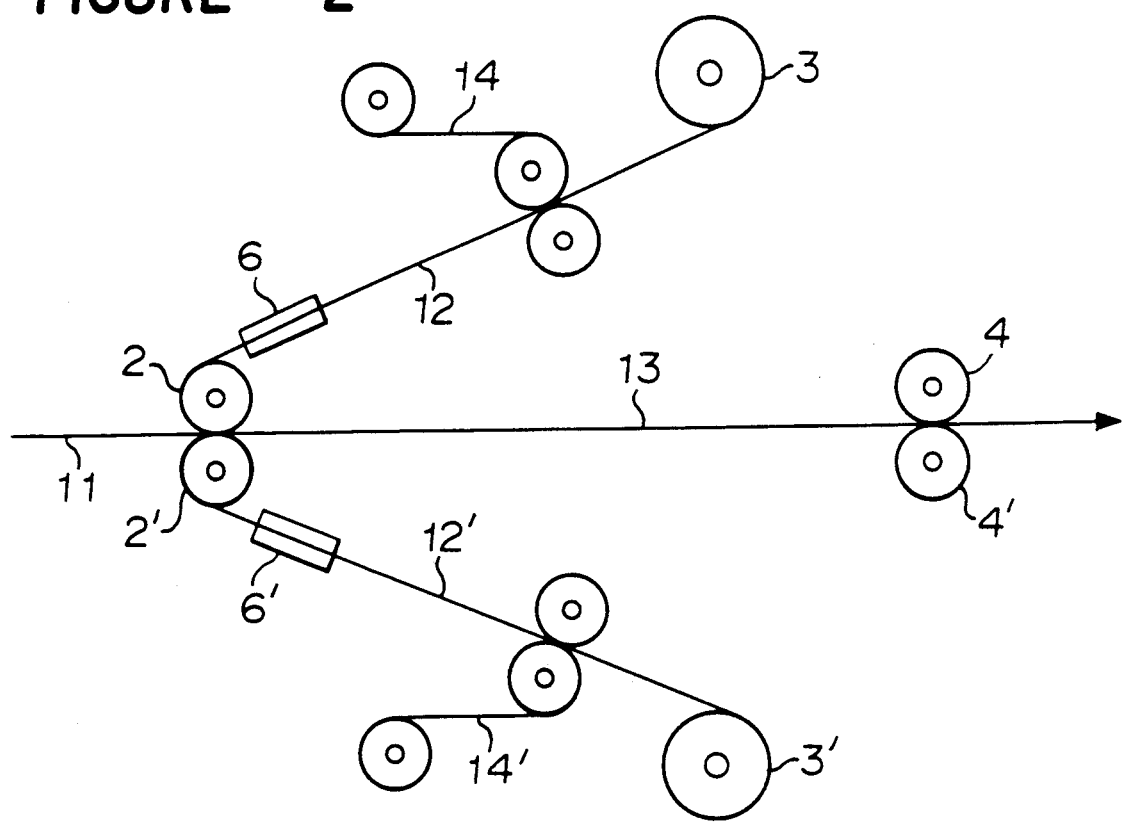

As shown in FIG. 2, adhesive layers may continuously be formed between pay off reels 3 and 3' and preheaters 6 and 6' from thin films 14 and 14' preliminarily prepared to form the adhesive layers.

Figure 3:
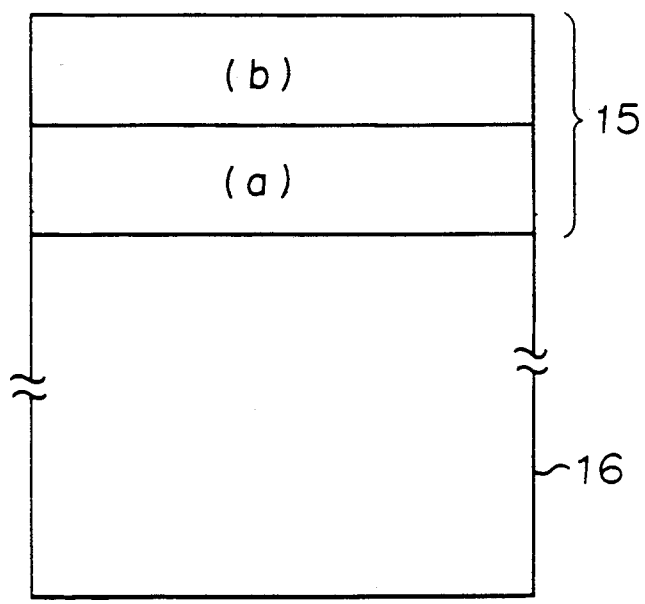
FIG. 3 shows a cross sectional view of a metal sheet having a double-layered adhesive layer applied thereon.

However, as shown in FIG. 3, an adhesive layer composed of double layers 15(a) and 15(b) may preliminarily be formed on a metal sheet 16, whereby it is unnecessary to separately form adhesive layers as mentioned above.

In this case, the layer 15(a) in contact with the metal sheet 16 may be made of a polyolefin modified by an unsaturated carboxylic acid or its derivative. Specifically, such an unsaturated carboxylic acid includes acrylic acid, methacrylic acid, fumaric acid, maleic acid, itaconic acid and citraconic acid. The unsaturated carboxylic acid derivative includes an acid anhydride, an ester, an amide, an imide and a metal salt. For example, there may be mentioned maleic anhydride, citraconic anhydride, itaconic anhydride, vinyl acetate, methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, diethyl itaconate, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide, maleimide, N-butylmaleimide, N-phenylmaleimide, sodium acrylate, sodium methacrylate, potassium acrylate, potassium methacrylate and diglycidyl acrylate. Among them, it is most preferred to use maleic anhydride.

For grafting the above-mentioned monomer to a polyolefin, conventional various methods may be employed. For example, grafting may be conducted by heating a polyolefin and the graft monomer at a high temperature in the presence or absence of a solvent with or without an addition of a radical initiator. In the reaction, other vinyl monomer such as styrene may be present. The amount of the graft monomer grafted to the polyolefin (hereinafter referred to simply as a graft rate) is preferably adjusted to be within a range of from $10^{-4}$ to 3% by weight. The polyolefin may be partially or wholly grafted. However, from the viewpoint of industrial production, it is preferred to preliminarily prepare a modified polyolefin having a graft rate of from $10^{-2}$ to 6% by weight, and then this modified polyolefin is incorporated to a non-modified polyolefin, since it is thereby possible to suitably adjust the concentration of the graft monomer in the composition.

The outer layer 15(b) of the adhesive layer may be made of the same resin as described above with respect to the thermoplastic resin sheet as the core material. As the outer adhesive layer 15(b), a virgin material is usually employed to facilitate the control of the layer thickness. Further, the case wherein the core material is made of a high density polyethylene and the outer adhesive layer is made of a low density polyethylene, is also included in the "same resin" of the present invention.

The thickness of the adhesive layer is usually from 5 to 100 μm, preferably from 10 to 80 μm, as the total thickness of layers 15(a) and 15(b) in the case of the double layered structure. If the thickness is too thin, it will be difficult to attain a uniform coating and tends to lower the adhesive strength. On the other hand, if the thickness is too much, such is not economically advantageous, and the surface smoothness of the resulting composite laminate will be poor.

As the metal sheet, aluminum or iron foil is used. However, this includes alloys composed essentially of aluminum or iron, such as an aluminum-magnesium alloy, an aluminum-silicon alloy and a stainless steel.

The thickness of the metal sheet is usually within a range of from 0.01 to 0.5 mm, and the sheet is employed usually after surface treatment such as degreasing treatment.

A feature of the present invention resides in that when the metal sheets are fed to the hot press bonding rollers, a tension of at least a certain specific level is exerted to the metal sheets (12 and 12' in FIG. 1).

Namely, in the case of aluminum, a tension of at least 2 kg/mm² is applied, and in the case of iron, a tension of at least 6 kg/mm² is applied. The control of the tension is conducted by imparting a driving force to the haul off rolls 4,4' while applying an anti-driving force to the pay off reels 3 and 3'. Such a tension is at least the above-mentioned level and is selected within such a range that no parmanent elongation results in the metal sheets.

By exerting such a tension to the metal sheets, the metal sheets are stretched within the elastic limit, whereby a distortion or waves present mainly at both ends of the sheets disappear to present very good surface smoothness. In the present invention, the metal sheets are instantaneously bonded to the solid thermoplastic synthetic resin sheet when they are in such a stretched condition, whereby it is possible to directly prepare a composite laminate having excellent surface smoothness. However, the formed composite laminate may further be subjected to correction by means of rollers disposed in a zigzag fashion.

The hot press bonding rollers 2 and 2' may be free rollers having no driving force or may be driving rollers having a driving force. When the rollers 2 and 2' are driving rollers, it is possible to impart a higher tension to the metal sheets by a combined force with the haul off rolls 4 and 4'.

The clearance between the rollers is maintained to be smaller than the sum of the thicknesses of the two metal sheets and of the solid thermoplastic synthetic resin sheet, so that the hot press bonding can be conducted by exerting a pressing force to these sheets. Accordingly, the clearance between the rollers is usually set at a level smaller by from 50 to 2,000 μm, preferably from 100 to 1,000 μm, than the sum of the above-mentioned thicknesses, and the pressing pressure is selected at a level where the composite laminate undergoes no deformation i.e. usually within a range of from 1 to 100 kg/cm, preferably from 5 to 50 kg/cm.

The hot press bonding rollers 2 and 2' are required not only for exerting the above-mentioned pressure, but also for maintaining the thermoplastic adhesive layer in a molten state at a predetermined temperature.

The solid thermoplastic synthetic resin sheet will be in contact with the thermoplastic adhesive layer in a molten state while receiving a pressing pressure between the hot press bonding rollers, and a very thin surface portion thereof is instantaneously heated and brought in a molten state, whereupon the metal sheets are heat-bonded to both sides of the solid thermoplastic synthetic resin sheet, and then withdrawn under a tension by the haul off rolls under natural cooling to obtain a composite laminate.

Accordingly, the temperature of the hot press bonding rollers 2 and 2' is required to be at a level sufficient to maintain the adhesive layer in a molten state and is usually within a range of from 100 to 200° C., preferably from 120 to 150° C., although it varies depending upon the preheating condition by preheaters 6 and 6'. The temperature is controlled at the predetermined level by supplying a heating medium to the interior of the hot press rollers.

Now, the present invention will be described in further detail with reference to Examples. However, it should be understood that the present invention is by no means restricted to such specific Examples.

EXAMPLE 1

By means of the apparatus as shown in FIG. 1, a low density polyethylene was continuously extruded from an extruder 5 at a resin temperature of 220° C. and passed through specular finished a three-roll 1 to obtain a polyethylene sheet having a thickness of 1.8 mm and a width of 1,220 mm. The sheet was contolled by the a a three-roll with high precision in thickness (± 0.02 mm) and then left to cool naturally to obtain a solid sheet (40° C.), which was then fed to hot press bonding rollers.

On the other hand, aluminum sheets 12 and 12' each having a thermoplastic resin adhesive layer provided thereon, were supplied from pay off reels 3 and 3'. As the aluminum sheets 12 and 12', those subjected to surface smoothing treatment and having a thickness of 0.1 mm and a width of 1,220 mm, were used. The thermoplastic adhesive layer was a double-layered adhesive layer prepared by applying a low density polyethylene thickness: 10 μm) modified by grafting 500 ppm of maleic anhydride, on the aluminum sheet and a non-modified low density polyethylene (thickness: 10 μm) thereon.

The above aluminum sheets were heated by preheaters 6 and 6' so that the adhesive layer side was in a molten state at 140° C. and the metal side was 133° C., and then supplied to the hot press bonding rollers.

The driving force of the haul off rolls 4 and 4' and the anti-driving force of the pay off reels 3 and 3' were controlled, no driving force was exerted to the hot press bonding rollers 2 and 2', and the clearance between rollers 2 and 2' was maintained to be about 1.7 mm, whereby a tension of 2.12 kg/mm² was exerted to each of the aluminum sheets 12 and 12'.

Figure 4:
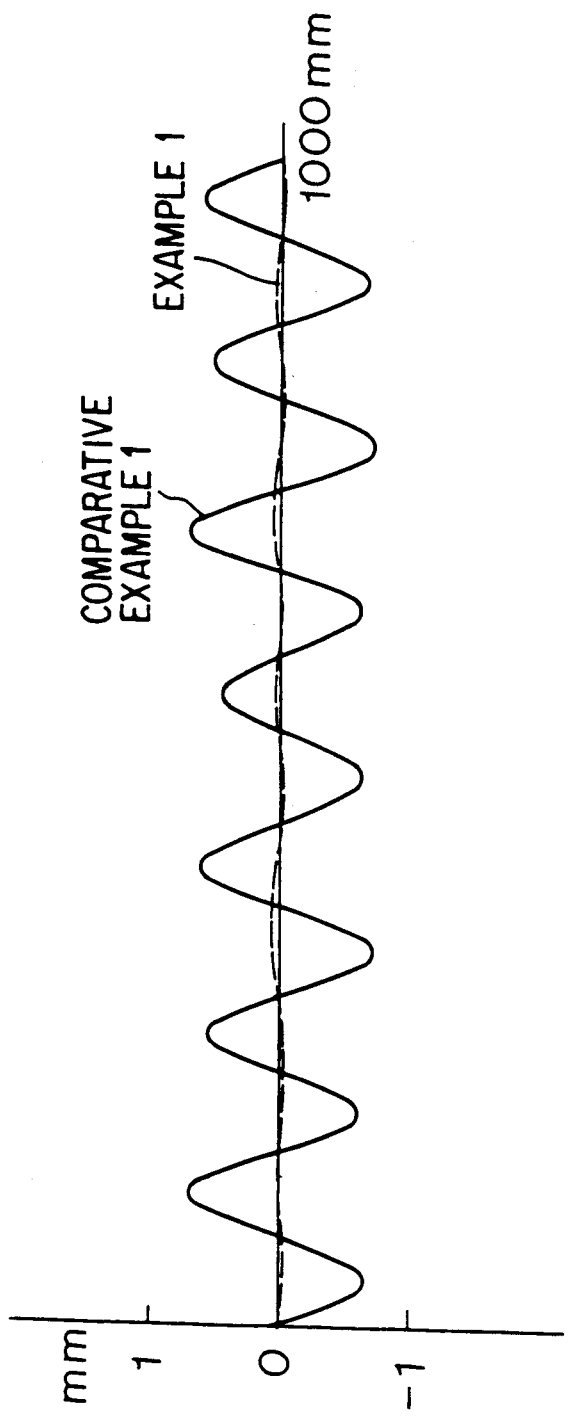
FIG. 4 shows transverse waves at the end portions of the composite laminates obtained in Example 1 (broken line) and Comparative Example 1 (solid line).

The composite laminate thus obtained had a thickness of 2.0 mm, and the bonding strength was 8.5 kg/inch. The surface smoothness was excellent, and no wrinkles or waves were observed by visual observation. With respect to a part (length: 1,000 mm) of the composite laminate thus obtained, transverse waves at 5 mm from the end in the stretching direction, were measured, and the chart thereby obtained is shown in FIG. 4 (broken line).

COMPARATIVE EXAMPLE 1

A composite laminate was prepared in the same manner as in Example 1 except that in Example 1, the anti-driving force exerted to the pay off reels 3 and 3' was reduced so that the tension exerted to each aluminum sheet was 1.27 kg/mm$^2$. The bonding strength of the composite laminate thus obtained was substantially equal to Example 1, but the surface smoothness was inferior. The transverse waves at the end portion were measured in the same manner as in Example 1, and the chart thereby obtained is shown in FIG. 4 (solid line).

COMPARATIVE EXAMPLE 2

A composite laminate was prepared in the same manner as in Example 1 except that the extruder 5 was disposed immediately in front of the hot press bonding rollers 2 and 2' so that the polyethylene sheet was fed in a molten state at 220° C. In the longitudinal direction (the withdrawing direction in the production line, which is the same as the stretching direction) of the composite laminate thereby obtained, four wrinkles (longitudinal waves) were observed, and the surface smoothness was inferior.

EXAMPLE 2

A composite laminate was prepared in the same manner as in Example 1 except that in Example 1, stainless steel sheets were employed instead of the aluminum sheets and a tension of 8 kg/mm$^2$ was imparted to each stainless steel sheet. The bonding strength of the composite laminate thereby obtained was 15 kg/inch, the surface smoothness was excellent, and no wrinkles or waves were observed by visual observation. With respect to a part of the composite laminate thus obtained, transverse waves at 5 mm from the end were measured in the same manner as in Example 1, and the chart thereby obtained is shown in FIG. 5 (broken line).

COMPARATIVE EXAMPLE 3

A composite laminate was prepared in the same manner as in Example 2 except that the tension exerted to each stainless steel sheet was changed to 4.8 kg/mm$^2$. The composite laminate thereby obtained was inferior in the surface smoothness. The chart showing the transverse waves at the end portion is shown in FIG. 5 (solid line).

As described in the foregoing, according to the method of the present invention, a composite laminate having excellent surface smoothness is obtainable. Further, since a solid thermoplastic synthetic resin sheet is used, the process for preparing the resin sheet and the step of hot press bonding with the metal sheets can be separated, whereby the start up of the process or the trouble shooting can be facilitated. Furthermore, since a solid sheet is employed, the speed of the hot press bonding step can freely be changed. When a resin in a molten state is employed, it used to be required that the width of the metal sheets is made wider than the resin sheet in order to prevent adhesion of the molten resin to the hot press bonding rollers, and the metal sheets were trimmed after the bonding. Whereas, according to the present invention, such trimming is not required, and the entire metal sheets can be effectively utilized, which is economically advantageous.

We claim:

1. A method for continuously producing a composite laminate comprising a thermoplastic synthetic resin sheet and an aluminum sheet laminated on each side of the resin sheet, wherein
   (1) as the thermoplastic resin sheet, a solid sheet 1–10 mm thick is used,
   (2) as the aluminum sheet, an aluminum sheet 0.01–0.5 mm thick having a thermoplastic adhesive layer provided on its surface is used,
   (3) two such aluminum sheets with the respective adhesive layers facing to each other, with the thermoplastic synthetic resin sheet interposed therebetween, are fed to hot press bonding rollers, and
   (4) when they are fed to the hot press bonding rollers, (a) a tension of at least 2 kg/mm$^2$ is exerted to each aluminum sheet, and (b) the thermoplastic adhesive layer provided on the surface of each aluminum sheet is maintained to be in a molten state.

2. The method according to claim 1, wherein the thermoplastic synthetic resin sheet is a polyolefin sheet.

3. The method according to claim 1, wherein the thermoplastic adhesive layer provided on the surface of the aluminum sheet has a double-layered structure comprising a layer of a polyolefin modified with an unsaturated carboxylic acid or its derivative, formed on the surface of the aluminum sheet and a layer of the same resin as used for the thermoplastic resin sheet as the core material, formed on the modified polyolefin layer.

4. A method for continuously producing a composite laminate comprising a thermoplastic synthetic resin sheet and an iron sheet laminated on each side of the resin sheet, wherein
   (1) as the thermoplastic resin sheet, a solid sheet 1–10 mm thick is used,
   (2) as the iron sheet, an iron sheet 0.01–0.5 mm thick having a thermoplastic adhesive layer provided on its surface is used,
   (3) two such iron sheets with the respective adhesive layers facing to each other, with the thermoplastic synthetic resin sheet interposed therebetween, are fed to hot press bonding rollers, and
   (4) when they are fed to the hot press bonding rollers, (a) a tension of at least 6 kg/mm$^2$ is exerted to each iron sheet, and (b) the thermoplastic adhesive layer provided on the surface of each iron sheet is maintained to be in a molten state.

5. The method according to claim 4, wherein the thermoplastic synthetic resin sheet is a polyolefin sheet.

6. The method according to claim 4, wherein the thermoplastic adhesive layer provided on the surface of the iron sheet has a double-layered structure comprising a layer of a polyolefin modified with an unsaturated carboxylic acid or its derivative, formed on the surface of the iron sheet and a layer of the same resin as used for the thermoplastic resin sheet as the core material, formed on the modified polyolefin layer.

* * * * *